(12) United States Patent
Adema et al.

(10) Patent No.: US 10,247,937 B2
(45) Date of Patent: Apr. 2, 2019

(54) LIGHT EMITTING WHEEL WITH ECCENTRICITY FOR DISPELLING A THERMAL BOUNDARY LAYER

(71) Applicant: CHRISTIE DIGITAL SYSTEMS USA, INC., Cypress (CA)

(72) Inventors: Daniel Robert Adema, Kitchener (CA); Graham Hill, Waterloo (CA); Darren Pastrik, Kitchener (CA)

(73) Assignee: CHRISTIE DIGITAL SYSTEMS USA, INC., Cypress, CA (US)

(*) Notice: Subject to any disclaimer, the term of this patent is extended or adjusted under 35 U.S.C. 154(b) by 54 days.

(21) Appl. No.: 15/409,230

(22) Filed: Jan. 18, 2017

(65) Prior Publication Data

US 2017/0123201 A1 May 4, 2017

Related U.S. Application Data

(62) Division of application No. 14/169,373, filed on Jan. 31, 2014, now abandoned.

(51) Int. Cl.
| | |
|---|---|
| G02B 26/00 | (2006.01) |
| G02B 7/00 | (2006.01) |
| F21V 29/50 | (2015.01) |
| F21V 9/30 | (2018.01) |
| G02B 21/16 | (2006.01) |
| G02B 21/20 | (2006.01) |
| F21V 9/16 | (2006.01) |
| G03B 21/20 | (2006.01) |
| F21V 29/502 | (2015.01) |
| G03B 21/16 | (2006.01) |

(52) U.S. Cl.
CPC .............. *G02B 26/008* (2013.01); *F21V 9/16* (2013.01); *F21V 9/30* (2018.02); *F21V 29/502* (2015.01); *G02B 7/006* (2013.01); *G02B 7/008* (2013.01); *G03B 21/16* (2013.01); *G03B 21/204* (2013.01)

(58) Field of Classification Search
CPC . F21V 9/16; F21V 9/30; F21V 29/502; G02B 7/0008; G02B 7/008; G02B 7/006; G02B 26/008; G03B 21/204; G03B 21/2033; G03B 21/16; H04N 9/3161
USPC ................... 359/885, 887, 889–892; 353/52
See application file for complete search history.

(56) References Cited

U.S. PATENT DOCUMENTS

| | | | | |
|---|---|---|---|---|
| 2014/0125956 | A1* | 5/2014 | Chifu | G02B 27/48 353/31 |
| 2014/0168613 | A1* | 6/2014 | Wang | G03B 21/204 353/31 |
| 2015/0198167 | A1* | 7/2015 | Tan | F04D 27/004 417/32 |

OTHER PUBLICATIONS

Adema, Daniel Robert, et al, "A Light Emitting Wheel With Eccentricity for Dispelling a Thermal Boundary Layer", U.S. Appl. No. 14/169,373, filed Jan. 31, 2014.

* cited by examiner

*Primary Examiner* — Marin Pichler
(74) *Attorney, Agent, or Firm* — Perry + Currier, Inc.

(57) ABSTRACT

A light emitting wheel with eccentricity for dispelling a thermal boundary layer a light emitting material is provided, including a device comprising: a light emitting material; a cooling plate configured to cool the light emitting material, the cooling plate comprising a center-of-mass that is different from a center-of-rotation of the cooling plate; and, a hub located at the center-of-rotation of the cooling plate.

5 Claims, 13 Drawing Sheets

LIGHT EMITTING WHEEL WITH ECCENTRICITY FOR DISPELLING A THERMAL BOUNDARY LAYER

CROSS-REFERENCE TO RELATED APPLICATIONS

This application is a divisional application of U.S. patent application Ser. No. 14/169373 filed on Jan. 31, 2014, which is incorporated herein by reference.

FIELD

The specification relates generally to light generation systems, and specifically to a light emitting wheel with eccentricity for dispelling a thermal boundary layer.

BACKGROUND

In a laser-light emitting material wheel illumination system, such as a laser-ceramic phosphor wheel, a laser-quantum dot wheel, and the like, thermal resistance from the wheel to the air is one of the dominant thermal impedances. In other words, hot air collects around the wheel due to convective heating of the air by the heated wheel. The thermal boundary layer is a key contributor to the thermal resistance.

SUMMARY

In general, this disclosure is directed to a light emitting wheel with eccentricity for dispelling a thermal boundary layer, for example a phosphor, quantum dots, and the like on a light emitting wheel. Such light emitting wheels can be illuminated by high power lasers and/or a plurality of low-power lasers, however excitation of the light emitting material by the lasers, as well as absorption/dissipation of the laser light, generates heat, which convectively raises the temperature of the air adjacent to the wheel, which forms a thermal boundary layer which contributes to the thermal resistance of heat from the wheel to the air. In present implementations, the wheel is provided with an off-center center-of-mass, to deliberately introduce eccentricity to the wheel when rotating. This causes the wheel to one or more of vibrate and oscillate which in turn dispels and/or disrupt the thermal boundary layer and reduce thermal impedance.

In this specification, elements may be described as "configured to" perform one or more functions or "configured for" such functions. In general, an element that is configured to perform or configured for performing a function is enabled to perform the function, or is suitable for performing the function, or is adapted to perform the function, or is operable to perform the function, or is otherwise capable of performing the function.

It is understood that for the purpose of this specification, language of "at least one of X, Y, and Z" and "one or more of X, Y and Z" can be construed as X only, Y only, Z only, or any combination of two or more items X, Y, and Z (e.g., XYZ, XYY, YZ, ZZ, and the like). Similar logic can be applied for two or more items in any occurrence of "at least one . . . " and "one or more . . . " language.

The present specification provides a device comprising: a light emitting material; a cooling plate configured to cool the light emitting material, the cooling plate comprising a center-of-mass that is different from a center-of-rotation of the cooling plate; and, a hub located at the center-of-rotation of the cooling plate.

The cooling plate can comprise a weight that is off-center from the center-of-rotation of the cooling plate.

The cooling plate can comprise a cut-out that is off-center from the center-of-rotation of the cooling plate.

The cooling plate can comprise an outer edge that is one or more of: lacking circular symmetry; and configured to shift the center-of-mass from the center-of-rotation of the cooling plate.

The cooling plate can comprise one or more of: at least one side that is tapered; and sides that are not parallel.

The center-of-rotation can be different from a geometric center of the cooling plate.

The cooling plate can comprise one or more of: a geometric circular symmetry, other than in a given area that is off-center from the center-of-rotation of the cooling plate; and the geometric circular symmetry with mass asymmetry, so that the center-of-mass is different from a geometric center of the cooling plate.

The hub can be flexible.

The present specification further provides a system comprising: a device comprising: a light emitting material; a cooling plate configured to cool the light emitting material, the cooling plate comprising a center-of-mass that is different from the center-of-rotation of the cooling plate; and, a hub located at the center-of-rotation of the cooling plate; a shaft configured to mate with the hub; and, a motor configured to rotate the shaft so that the hub and cooling plate rotate in response to rotation of the shaft, the center-of-mass of the cooling plate being off-center causing the cooling plate to one or more of vibrate and oscillate when rotated.

At least a portion of the hub can be flexible.

The system can further comprise a respective hub connecting the shaft to the motor, at least a portion of the respective hub being flexible.

The system can further comprise a base, the motor mounted to the base, at least a portion of the base being flexible so that the motor is isolated from the base when the cooling plate is rotated.

The system can further comprise: a bearing for supporting the shaft; and a base, the bearing one or more of comprising the base and mounted on the base, at least a portion of the base being flexible so that the shaft is isolated when the cooling plate is rotated.

The cooling plate can comprise one or more of: a weight that is off-center from the center-of-rotation of the cooling plate; a cut-out that is off-center from the center-of-rotation of the cooling plate; an outer edge that is one or more of: lacking circular symmetry; and configured to shift the center-of-mass from the center-of-rotation of the cooling plate; the center-of-rotation being different from a geometric center of the cooling plate; one or more of: at least one side that is tapered; and sides that are not parallel; and, one or more of: a geometric circular symmetry, other than in a given area that is off-center from the center-of-rotation of the cooling plate; and the geometric circular symmetry with mass asymmetry, so that the center-of-mass is different from a geometric center of the cooling plate.

The present specification yet further provides a system comprising: a device comprising: a light emitting material; a cooling plate configured to cool the light emitting material; and, a hub located at the center-of-rotation of the cooling plate; a shaft configured to mate with the hub; and, a motor configured to rotate the shaft so that the hub and cooling plate rotate in response to rotation of the shaft, one or more of the shaft and a rotational portion of the motor configured to one or more of vibrate and oscillate when rotated, which in turn causes the device to one or more of vibrate and oscillate when rotated.

A center-of-mass of one or more the shaft and the rotational portion of the motor can located off of a respective rotational axis.

One or more of the shaft and the rotational portion of the motor can comprise one or more of a bend and a kink.

BRIEF DESCRIPTIONS OF THE DRAWINGS

For a better understanding of the various implementations described herein and to show more clearly how they may be carried into effect, reference will now be made, by way of example only, to the accompanying drawings in which.

DETAILED DESCRIPTION

Figure 1:
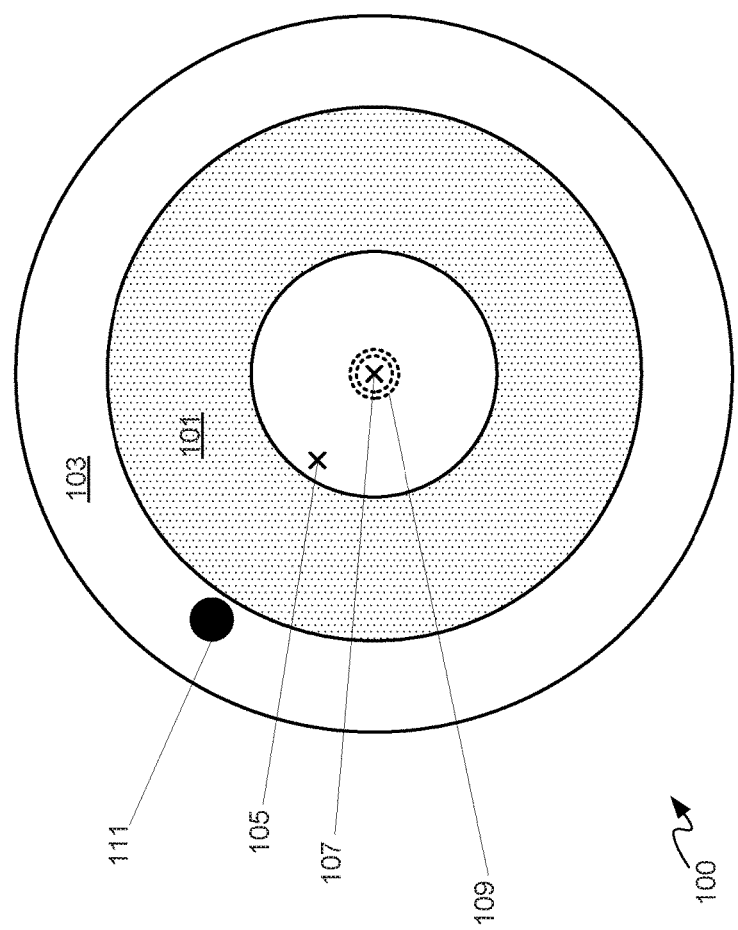
FIG. 1 depicts a front elevation view of a device comprising a light emitting wheel with eccentricity, according to non-limiting implementations.
Figure 2:
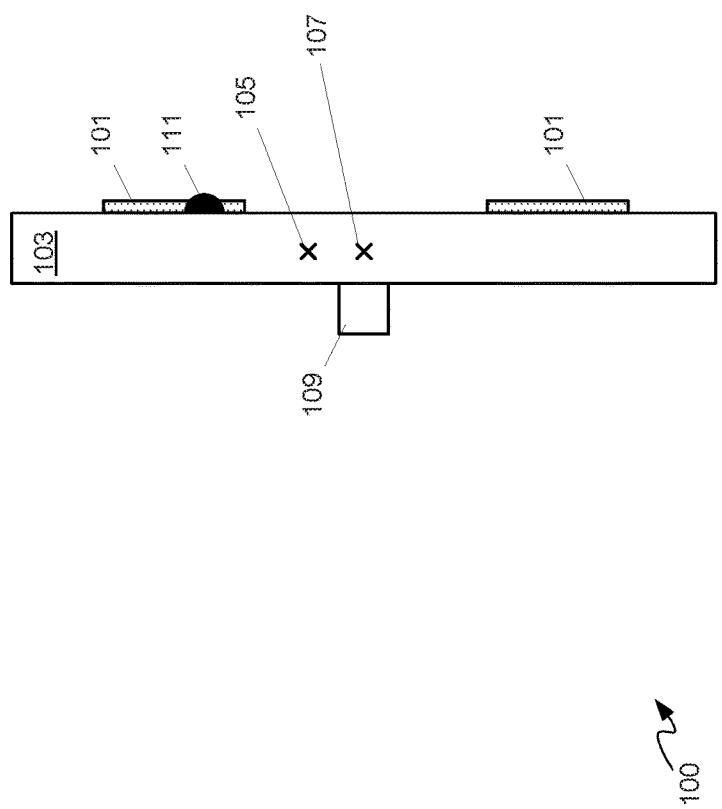
FIG. 2 depicts a side elevation view of the device of FIG. 1, according to non-limiting implementations.

FIGS. 1 and 2 depict a device 100 configured to cool a light emitting material. Specifically: FIG. 1 depicts a front elevation view of device 100; and FIG. 2 depicts a side elevation view of device 100. In general, device 100 comprises a light emitting wheel with eccentricity for dispelling a thermal boundary layer. Specifically, device 100 comprises: a light emitting material 101; a cooling plate 103 configured to cool light emitting material 101, cooling plate 103 comprising a center-of-mass 105 that is different from a center-of-rotation 107 of cooling plate 103; and, a hub 109 located at center-of-rotation 107 of cooling plate 103. Hub 109 is depicted in outline in FIG. 1, as hub 109 is generally located on a side opposite light emitting material 101 and/or a rear side of cooling plate 103, presuming light emitting material 101 is located on front side of cooling plate 103. As depicted, cooling plate 103 comprises a weight 111 that is off-center from center-of-rotation 107 of cooling plate 103 which results in center-of-mass 105 being located along a line (not depicted) between center-of-rotation 107 and weight 111. Relative sizes and thicknesses of elements in FIGS. 1 and 2 are appreciated to be not to scale.

Light emitting material 101 can include, but is not limited to, one or more of a phosphor, a ceramic phosphor, quantum dots, a luminescent material, a fluorescent material, and the like; indeed, while present implementations will be described with regard to ceramic phosphors, other light emitting materials are within the scope of present implementations. Specifically, light emitting material 101 comprises any material that emits light of at least a first wavelength when excited by light of at least a second wavelength; in general, the first wavelength is longer than the second wavelength.

For example, in some implementations, light emitting material 101 can be configured for excitation by blue laser light, and emit light of a wavelength longer than the blue laser light, including, but not limited to, red light and green light. Further, in some implementations, light emitting material 101 comprises more than one light emitting material located, for example, in segments on cooling plate 103. For example, one or more segments of light emitting material 101 can emit red light, while one or more other segments of light emitting material 101 can emit green light. Hence, as device 100 turns and/or rotates, as describe below, the blue laser light, and the like interacts with the different segments of light emitting material 101.

Device 100 can generally be used in a projection system (not depicted), in which, for example, blue laser light excites light emitting material 101, which emits red light and/or green light and/or yellow light, the blue laser light, the emitted light providing RGB (red-green-blue) light and/or white light to the projection system. Alternatively, light emitting material 101 can emit blue light in the RGB/white system.

In general, the process of exciting light emitting material 101 to emit light results in the production of heat which is to be dissipated to prevent light emitting material 101 and cooling plate 103 from heating up. Hence, light emitting material 101 is located on cooling plate 103 which is configured to further cool light emitting material 101 from the interface between cooling plate 103 and light emitting material 101. Hence, cooling plate 103 generally comprises a material having thermal conduction properties for removing heat from light emitting material 101.

For example, light emitting material 101 can be bonded to cooling plate 103 at an interface there between using any suitable process and/or bonding material including, but not limited to, welding, soldering, annealing and the like, and epoxies, glues and the like. For example, in some implementations, light emitting material 101 can comprise a block of phosphor comprising a phosphorescent material dispersed in matrix material. Such a block can be bonded to cooling plate 103.

Heat then generally flows into cooling plate 103 from the interface between light emitting material 101 and cooling plate 103, the heat being dissipated at cooling plate 103. Hence, cooling plate 103 comprises one or more of a heat sink, a block, a wheel, a ring, and a water-block configured to cool light emitting material 101. Cooling plate 103 can comprise any material configured to cool light emitting material 101 including, but not limited to, metal, aluminum, steel and the like. Further, as depicted, cooling plate 103 comprises a plate of material with nominally circular symmetry, with the exception of the location of weight 111, which is off-center of cooling plate 103. However, shapes that do not have circular symmetry are within the scope of present implementations: for example, device 100 can be regularly shaped (though without circular symmetry), irregularly shaped, rectangular and the like.

Further, in some implementations, cooling plate 103 can be about 1 mm thick, with a diameter in a range of about 40 mm to about 120 mm, and light emitting material 101 can be about 0.2 mm thick. However, other dimensions are within the scope of present implementations.

In some implementations, cooling plate 103 comprises a mirror and/or a reflective surface for reflecting the emitted light from light emitting material 101 away from cooling plate 103. For example, light emitted from light emitting material 101 can be emitted in all directions, including towards cooling plate 103; hence cooling plate 103 can comprise a mirror, at least in an area of light emitting material 101, for reflecting emitted light impinging thereupon away from cooling plate 103. Hence, cooling plate 103 can comprise a polished metal at least in the area of light emitting material 101.

In general, however, there is a thermal mismatch between light emitting material 101 and cooling plate 103. For example, ceramic phosphor materials can have a coefficient of thermal expansion (CTE) about 6 to 7 um/m-K, while cooling plate 103 generally comprises a metal, including but not limited to aluminum, with a CTE of about 22 um/m-K. Hence, when the temperature of device 100 rises light emitting material 101 expands at a slower rate than cooling plate 103, which can lead to mechanical failure of device 100: i.e. light emitting material 101 can delaminate and the like from cooling plate 103. Such failure can occur under high light intensity conditions, for example when light impinging on light emitting material 101 is above a given intensity. Alternatively, heating of the phosphor and/or light emitting material can reduce and/or damage the light emitting properties thereof.

Hence, device 100 is generally configured for rotation so that excitation light can interact with all segments of light emitting material 101, and/or so that heat production is distributed in light emitting material 101. For example, hub 109 is generally configured to engage a shaft of a motor, the motor turning the shaft, which in turn turns hub 109, which causes device 100 to rotate about center-of-rotation 107. Hub 109 can hence comprise a mechanism for engaging a shaft of a motor; hub 109 can hence include, but is not limited to screws, fasteners, spring mechanisms, locking mechanisms, a receptacle for a shaft (as depicted), apertures through cooling plate 103, and the like, and combinations thereof. In some implementations, hub 109 can be integrated with cooling plate 103, while in other implementations, hub 109 can be attached to cooling plate at center-of-rotation 107 using fasteners, epoxies, and the like. As depicted, hub 109 extends perpendicularly from cooling plate 103 on a side opposite light emitting material 101. In some implementations, as described below, at least a portion of hub 109 can be at least partially flexible, as described below with reference to FIG. 7.

In any event, during heat production at light emitting material 101, convective air (and/or fluid) cooling generally provides cooling in addition to cooling provided by cooling plate, thought the accumulation of a heated thermal boundary layer at the surface of light emitting material 101 and/or on the cooling plate 103 surfaces generally impedes convective cooling of light emitting material 101.

To address this issue, in present implementations, weight 111 can be attached to cooling plate 103 using one or more of a fastener, glue, an epoxy and the like, thereby resulting in eccentricity at device 100. Alternatively, weight 111 can be integrated with cooling plate 103. In yet further implementations, more than one weight can be used to shift center-of-mass 105 from center-of-rotation 107. One or more weights can be located on either a same side of cooling plate 103 as light emitting material 101, and/or an opposite side of cooling plate 103.

Regardless, weight 111 is at a location on cooling plate, and is of a mass that causes center-of-mass 105 to be different from center-of-rotation 107. Specifically, the combination of a location of weight 111 and a mass of weight 111 is chosen so that when device 100 is rotated at rates and/or speeds commensurate with light production at light emitting material 101, in high light intensity conditions, device 100 to one or more of vibrate and oscillate at a frequency for dispelling a thermal boundary layer as described below. In general, center-of-mass 105 can be located between an external edge of cooling plate 103 and about ⅛ of a diameter, and the like, from center-of-rotation 107; while the location of center-of-mass 105 is expressed in terms of a radius the location can be expressed in other terms, for example, a line drawn from one or more edges of device 100 through center-of-rotation 107. In other words, the center-of-mass 105 and center-of-rotation 107 are not coincident and are also outside manufacturing tolerance of otherwise symmetric wheels.

For example, for symmetric phosphor wheel, "normal" manufacturing tolerances would locate the center-of-mass and the center-of-rotation within about 0.5 mm maximum, though such tolerances can depend on a diameter of the wheels. For example, such tolerances are within d/4 for wheels with a shaft of less than about 3 mm diameter, and within d/8 for wheels with a shaft of greater than or equal to about 3 mm diameter, where "d" is diameter of a shaft for turning the wheel: for example, as best seen from FIGS. 2 and 7, a shaft can be used to rotate device 100 using hub 109. Hence, in some implementations, d can also be an internal diameter of hub 109, presuming that the internal diameter of hub 109 and a diameter of a shaft to be received therein are about equal.

Hence, for device 100, center-of-mass 105 can be located between an external edge of cooling plate 103 and d/4 from center-of-rotation 107 when d is less than about 3 mm; alternatively, center-of-mass 105 can be located between an external edge of cooling plate 103 and d/8 from center-of-rotation 107 when d is greater than or equal to about 3 mm. Regardless, center-of-mass 105 is located so that device 100 experiences eccentricity and/or vibration and/or oscillation when rotated at speeds commensurate with laser-light emitting wheel systems. For example, such rotational speeds can range from about 240 rpm to about 9600 rpm, with about 7200 rpm being a "typical" and/or common speed at which phosphor wheels are generally operated, presuming rotation in air. However, other than practical considerations with regard to operating high-reliability motors, there is no upper limit to the rotational speed with regard to thermal performance.

Figure 3:
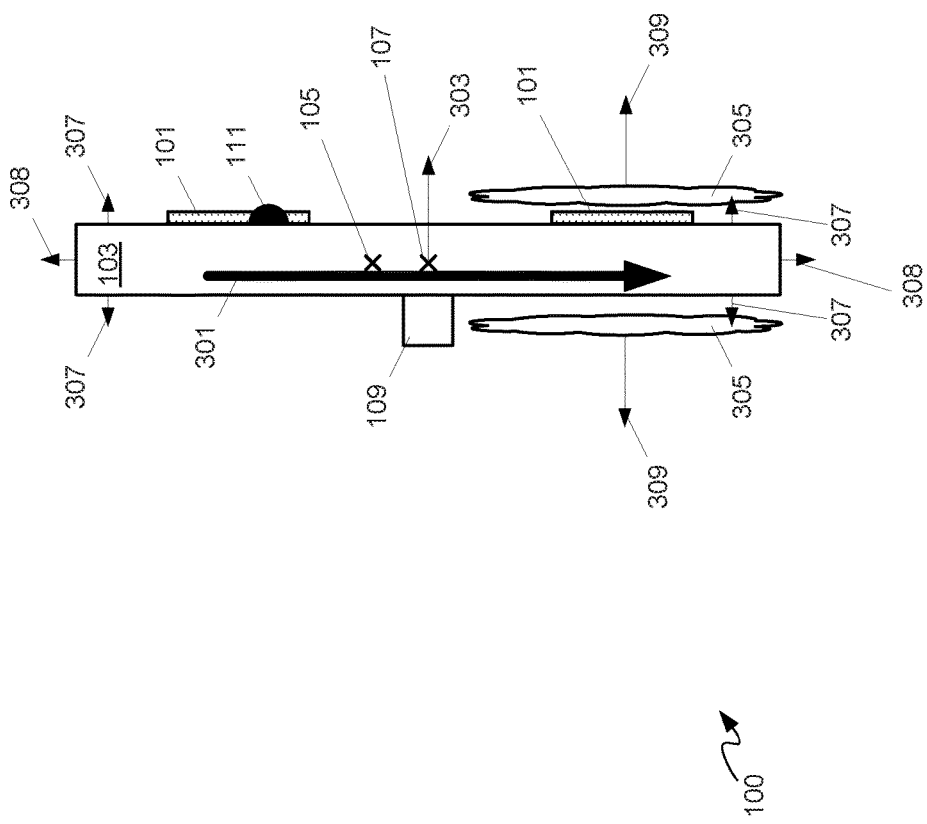
FIG. 3 depicts the device of FIGS. 1 and 2 in operation, according to non-limiting implementations.

For example, attention is next directed to FIG. 3 which depicts a side view of device 100 in operation. FIG. 3 is substantially similar to FIG. 2, with like elements having like numbers. It is assumed in FIG. 3, that device 100 is rotating, as indicated by arrow 301; in other words, device 100 is rotating in a direction perpendicular to a normal 303 from center-of-rotation 107, presuming that hub 109 has, for example, engaged a shaft of a motor. It is also presumed in FIG. 3 that excitation light (not depicted) is exciting light emitting material 101, and that emitted light (not depicted) is produced, and that heat is produced in this process. As such one or more thermal boundary layers 305 of heated air forms at the surface of cooling plate 103, on a same side as light emitting material 101 and/or on an opposite side of cooling plate from light emitting material 101.

Due to center-of-mass 105 being different from center-of-rotation 107 (i.e. as weight 111 is located off-center), device 100 one or more of vibrates and oscillates, as indicated by arrows 307, 308. In other words, device 100 vibrates and/or oscillates when rotated, for example in a direction parallel to normal 303 (as indicated by arrows 307), and/or in a direction perpendicular to normal 303 (as indicated by arrows 308) and/or about center-of-rotation 107 and/or about hub 109. The vibration and/or oscillation can comprise a regular and/or irregular wobble in device 100 when rotated. Furthermore, the vibration and/or oscillation can be from side-to-side (e.g. arrows 307) and/or lateral (e.g. 308). In addition, while each of arrows 307, 308 are depicted as being in a plane of FIG. 3, vibration and/or oscillation can occur in out of the plane of FIG. 3; indeed, the vibration and/or oscillation can be in more than one plane. In any event, the vibration and/or oscillation causes one or more thermal boundary layer 305 to dispel, as indicated by arrows 309, which assists in convective cooling of device 100. For example, the vibration can produce surface turbulence at cooling plate 103 and/or at light emitting material 101 in order to dispel one or more thermal boundary layers 305.

While device 100 is depicted as generally circular, in other implementations, device 100 can be another shape, including but not limited to shapes with nominally circular symmetry other than a mechanism to shift the center-of-mass away from the geometric center and/or center-of-rotation of device 100. For example, device 100 can comprise one or more of a light emitting material wheel, a light emitting material ring, and a light emitting material plate, and can be annular, square, pentagonal, hexagonal, heptagonal, octagonal, etc. In other implementations, device 100 can be regularly shaped, irregularly shapes, rectangular and the like.

Figure 4:
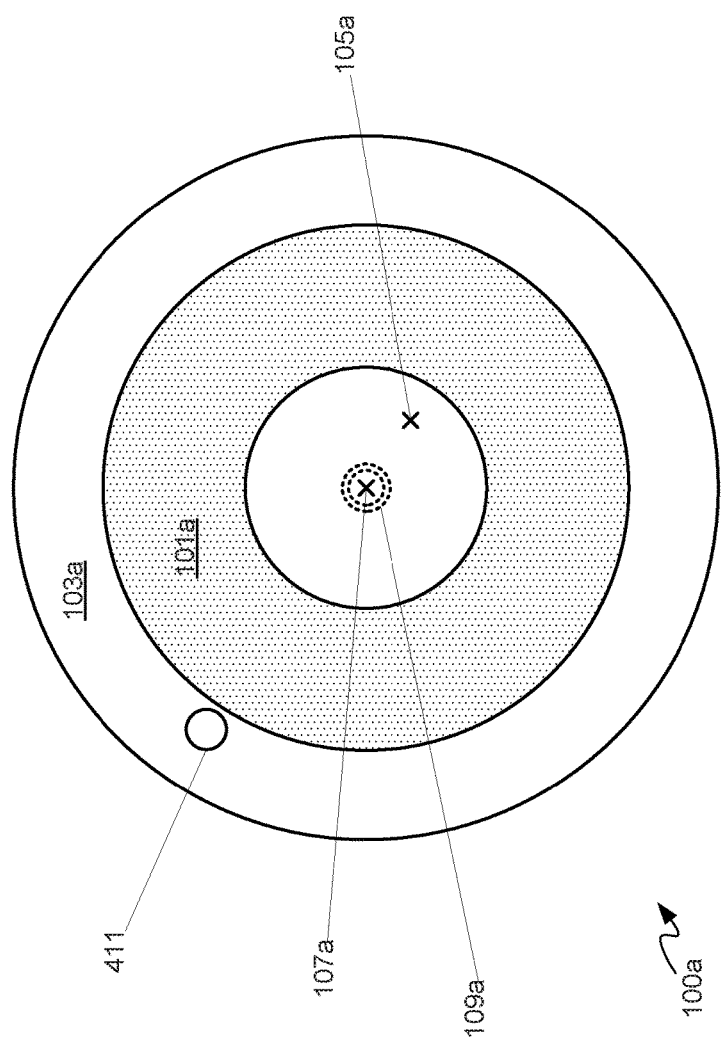
FIG. 4 depicts a front elevation view of a device comprising a light emitting wheel with eccentricity, according to alternate non-limiting implementations.

Other mechanisms for shifting the center-of-mass shift are within the scope of present implementations. For example is directed to FIG. 4 which is substantially similar to FIG. 1, with like elements having like numbers, however with an "a" appended thereto. Hence, FIG. 4 depicts a front elevation view of a device 100a, substantially similar to device 100, device 100a comprising a light emitting material 101a on a cooling plate 103a, a center-of-mass 105a that is different from center-of-rotation 107a of cooling plate 103a, and a hub 109a. However, in contrast to device 100, cooling plate 103a comprises one or more of a cut-out 411, and aperture and the like, that is off-center from center-of-rotation 107a of cooling plate 103a. Hence, center-of-mass 105a shifts away from cut-out 411, so that center-of-mass 105a is located along a line (not depicted) extending from cut-out 411 to center-of-rotation 107a, on a side opposite cut-out 411. It is appreciated that more than one cut-out and/or apertures can be used to shift center-of-mass 105a from center-of-rotation 107a.

In some implementations, rather than a cut-out and/or an aperture, the center-of-mass shift can occur using one more divots and the like, removed from one or more surfaces of cooling plate 103a.

Figure 5:
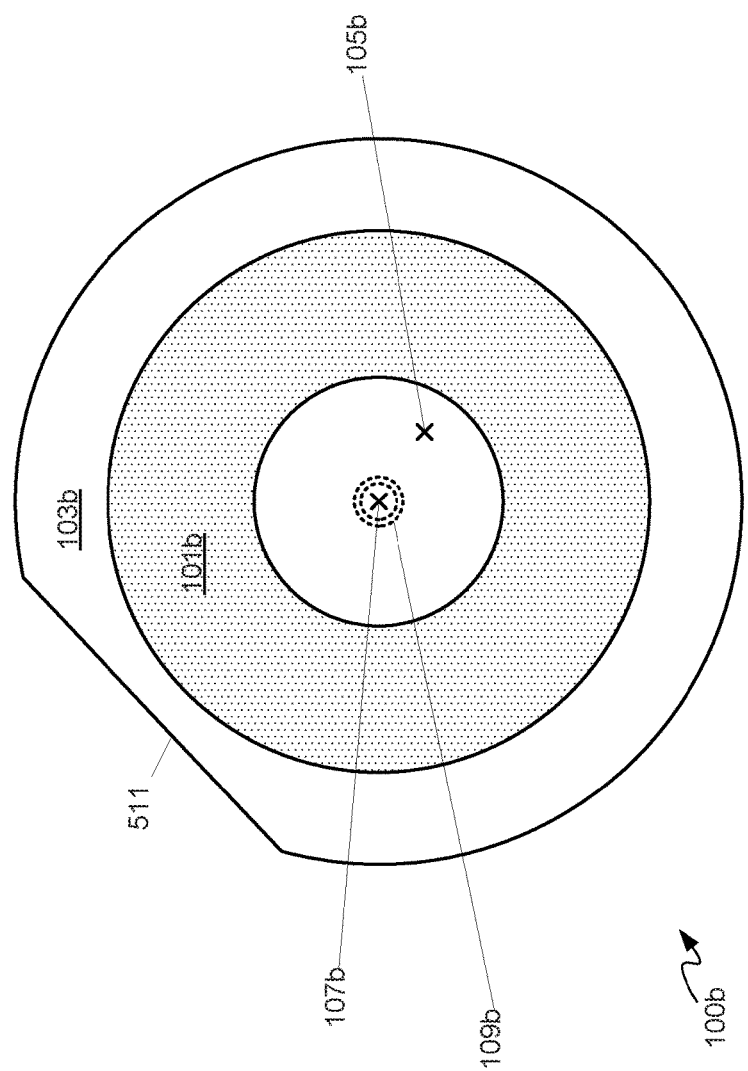
FIG. 5 depicts a front elevation view of a device comprising a light emitting wheel with eccentricity, according to alternate non-limiting implementations.

Yet further mechanisms for shifting the center-of-mass shift are within the scope of present implementations. For example is directed to FIG. 5 which is substantially similar to FIG. 1, with like elements having like numbers, however with a "b" appended thereto. Hence, FIG. 5 depicts a front elevation view of a device 100b, substantially similar to device 100, device 100b comprising a light emitting material 101b on a cooling plate 103b, a center-of-mass 105b that is different from center-of-rotation 107b of cooling plate 103b, and a hub 109b. However, in contrast to device 100, cooling plate 103a comprises an outer edge 511 that is one or more of: lacking circular symmetry; and configured to shift center-of-mass 105b from center-of-rotation 107b of cooling plate 103b. Hence, center-of-mass 105b shifts away from edge 511, so that center-of-mass 105b is located along a line (not depicted) extending from edge 511 to center-of-rotation 107b, on a side opposite edge 511.

In other words, device 100b has nominally circular symmetry, however one or more portions of an outer edge is removed in order to shift center-of-mass 105b from center-of-rotation 107b; for example, a circular cooling plate can be machined to remove one or more portions of an outer edge to shift the center-of-mass.

While edge 511 is depicted a straight-edge, edge 511 can be any shape, including jagged, curved and the like.

Figure 6:
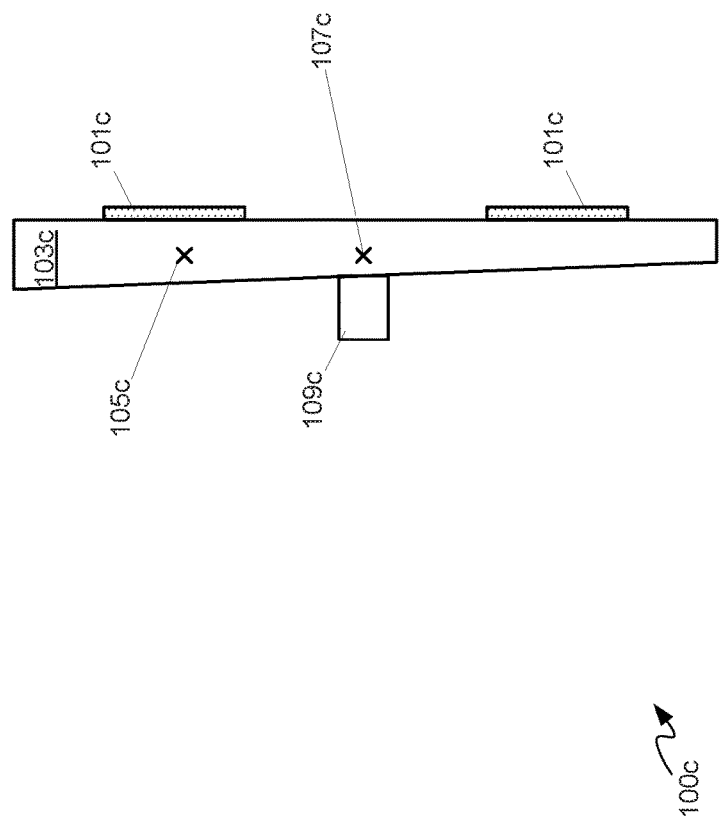
FIG. 6 depicts a side elevation view of a device comprising a light emitting wheel with eccentricity, according to alternate non-limiting implementations.

Yet further mechanisms for shifting the center-of-mass shift are within the scope of present implementations. For example is directed to FIG. 6 which is substantially similar to FIG. 2, with like elements having like numbers, however with a "c" appended thereto. Hence, FIG. 5 depicts a side elevation view of a device 100c, substantially similar to device 100, device 100c comprising a light emitting material 101c on a cooling plate 103c, a center-of-mass 105c that is different from a center-of-rotation 107c of cooling plate 103c, and a hub 109c. However, in contrast to device 100, cooling plate 103c is tapered on at least one side, as depicted on a side where hub 109c is located, and or sides that are not parallel (e.g. a side where light emitting material 101c is located is not parallel to an opposite side where hub 109c is located). Hence, cooling plate 103c comprises a thick end and a thin end, and center-of-mass 105c is located away from center-of-rotation 107c towards the thick end ("up" in FIG. 6, though the term "up" is not meant to be absolute with respect to the earth and/or the ground).

Further, any of the implementations described with reference to FIGS. 1 to 6 can be combined to shift a center-of-mass from center-of-rotation of a cooling plate. Indeed, any technique and/or apparatus for shift a center-of-rotation of a cooling plate is within the scope of present implementations. For example, in yet further implementations, a cooling plate can be manufactured from different materials and/or at different densities and/or with varying density, so the resulting cooling plate appears to be visually circular symmetrical, but has areas of higher density that shift a center-of-mass from a center-of-rotation.

In any event, cooling plates described herein generally comprise one or more of: a geometric circular symmetry, other than in a given area that is off-center from the center-of-rotation of the cooling plate; and geometric circular symmetry but mass asymmetry so that the center-of-mass is different from a geometric center-of-rotation of the cooling plate.

Figure 7:
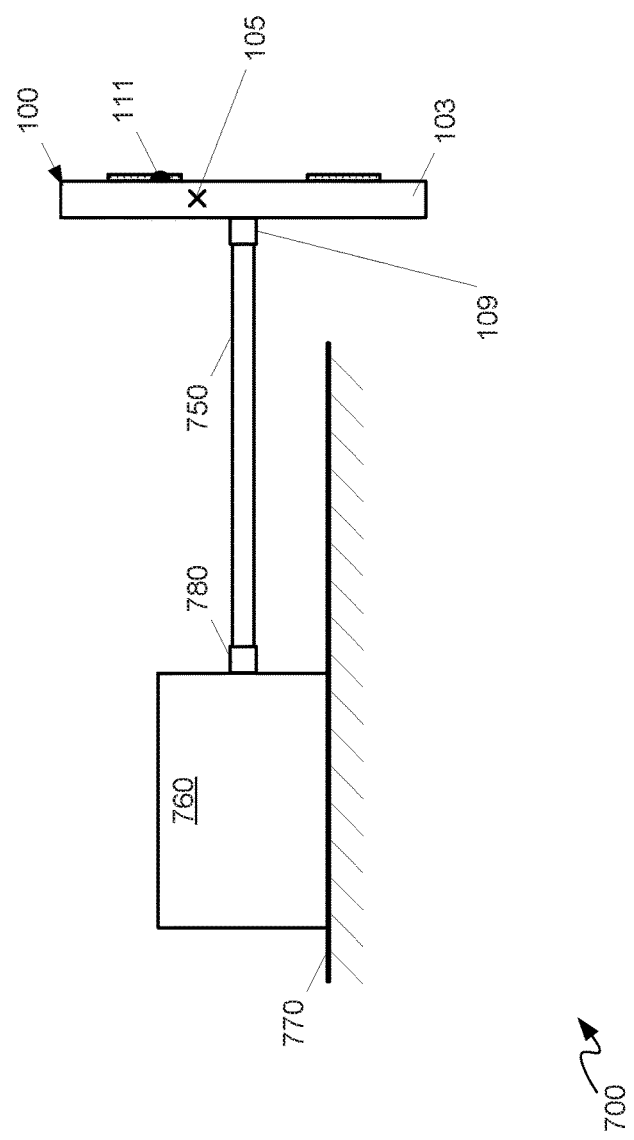
FIG. 7 depicts a system for dispelling a thermal boundary layer at a light emitting wheel, according to non-limiting implementations.

Attention is next directed to FIG. 7 which depicts a side elevation view of a system 700 comprising: one or of devices 100, 100a, 100b, 100c or the like, though device 100 is indicated in FIG. 7; a shaft 750 configured to mate with hub 109 (or the like) of device 100; and a motor 760 configured to rotate shaft 750 so that hub 109 and cooling plate 103 (and the like) rotate in response to rotation of shaft 750, center-of-mass 105 of cooling plate 103 being off-center causing cooling plate 103 to one or more vibrate and oscillate when rotated, as described above. In general, motor 760 is one more of supported by a surface 770 and mounted to surface 770, for example table top, a work bench, a portion of a projector, a portion of a light production system and the like. While as depicted surface 770 is "under" motor", in other implementations, surface 770 can be located above, behind and/or beside motor 760, with motor 760 mounted to surface 770.

Note that while not all elements of device 100 are labelled in FIG. 7, they are appreciated to be nonetheless present (e.g. light emitting material 101, center-of-rotation 107, and weight 111).

In some implementations, system 700 can be modified to one or more of: assist vibration of device 100 when rotating; and, prevent damage to one or of shaft 750 and motor 760 when device 100 rotates.

For example, in some implementations, at least a portion of one or more of hub 109 and a respective hub 780 of motor 760 is at least partially flexible, so that vibration of device 100 is at least partially absorbed and/or reduced prior to reaching motor 760 and/or shaft 750. Such flexibility does not eliminate vibration of device 100, however, and such vibration continues to disperse the thermal boundary layer, as described above with respect to FIG. 3. Hub 780 can be substantially similar to hub 780, however attached to, and rotatable by, motor 760 and configured to engage shaft 750 at an end opposite hub 109).

In implementations where one or more of hub 109 and hub 780 is at least partially flexible, one or more of hub 109 and hub 780 can at least partially comprise a flexible material including, but not limited to, rubber, flexible plastics, silicone and the like. Further, an interface between hub 109 and cooling plate 103 can be flexible, and/or an interface between hub 109 and shaft 750 can be flexible, and/or an interface between hub 780 and shaft 750 can be flexible and/or an interface between hub 780 and motor 760 can be flexible.

Figure 8:
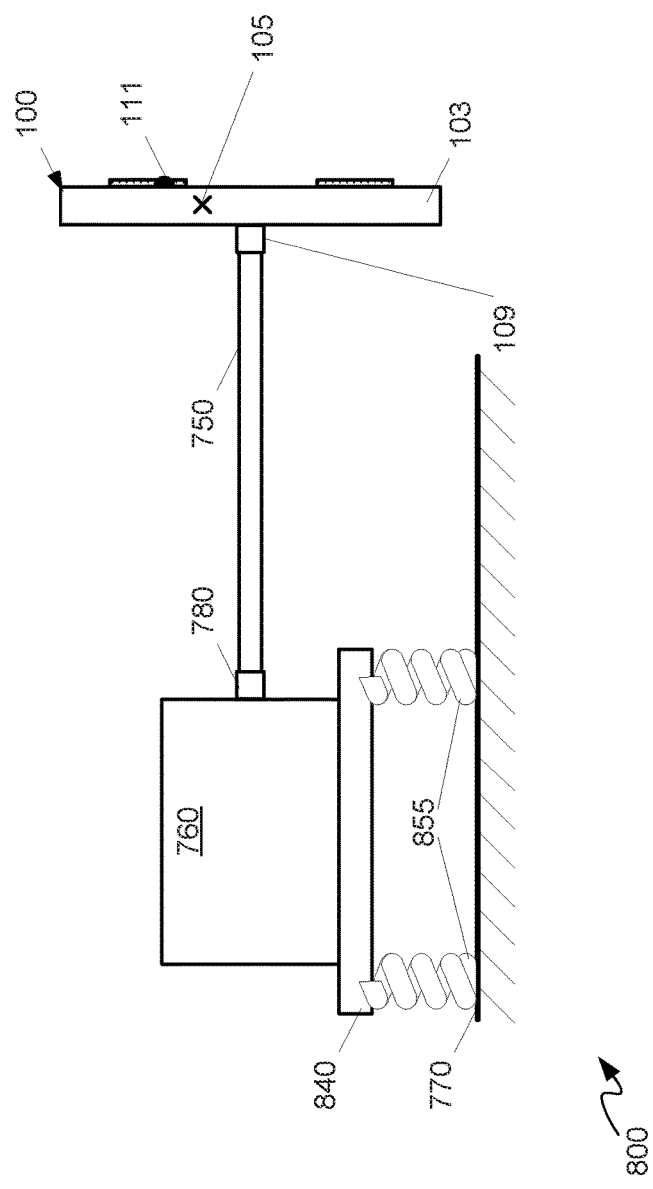
FIG. 8 depicts a system for dispelling a thermal boundary layer at a light emitting wheel, according to alternative non-limiting implementations.

Attention is next directed to FIG. 8, which depicts a system 800, similar to system 700, with like elements having like numbers. However, as compared to system 700, system 800 further comprising a base 840, motor 760 mounted to base 840, at least a portion of base 840 being flexible so that motor 760 one or more vibrates and oscillates when cooling plate 103 is rotated in addition to cooling plate 103 vibrating and/or oscillating. In other words, motor 760 is mounted to base 840, at least a portion of base 840 being flexible so that motor 760 is isolated from base 840 when cooling plate 103 is rotated. For example, as depicted, base 840 comprises one or more springs 855 located between motor 760 and surface 770, springs 855 attached, for example, to surface 770. In any event, as motor 760 rotates device 100, motor 760, shaft 750 and device 100 all one or more vibrate and oscillate, with springs 855 isolating motor 760e from surface 770 to protect the mechanical structure of motor 760 and/or to assist in vibration of device 100.

Figure 9:
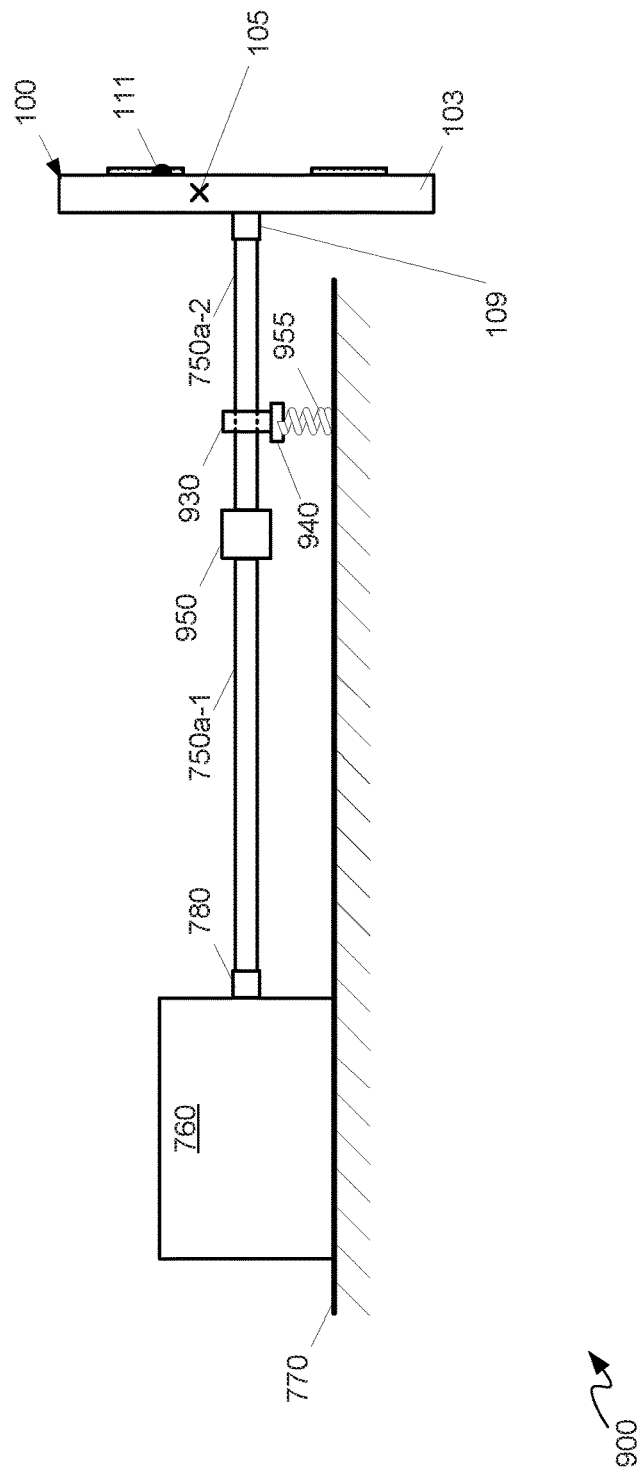
FIG. 9 depicts a system for dispelling a thermal boundary layer at a light emitting wheel, according to alternative non-limiting implementations.

Attention is next directed to FIG. 9, which depicts a system 900, similar to system 800, with like elements having like numbers. However, as compared to system 700, system 900 further comprising a bearing 930 for supporting shaft 750a-1, 750a-2; and a base 940, bearing 930 mounted on base 940 and/or including base 940, at least a portion of base 940 being flexible so that shaft 750a-2 one or more of vibrates and oscillates when cooling plate 103 is rotated, in addition to cooling plate 103 vibrating and/or oscillating. For example, bearing 930 can comprise a pillow bearing, shaft 750a-2 passing there through. As depicted shaft 750a-1, 750a-2 comprises a first portion 750a-1, similar to shaft 750, a second portion 750a-2, and a coupler 950 coupling a first portion 750a-1 to second portion 750a-2. For example, coupler 950 can include, but is not limited to, a spider coupler. Regardless, coupler 950 translates rotation of portion 750a-1 to portion 750a-2. Shaft 750a-1, 750a-2 will interchangeably be referred to hereafter as shaft 750a.

Coupler 950 is generally configured to isolate vibrations of portion 750a-2 and/or device 100 from portion 750a-1 and/or motor 760. Further, while as depicted shaft 750a comprises two portions 750a-1, 750a-2 and coupler 950, in other implementations, shaft 750a is similar to shaft 750 (i.e. without coupler 950).

In any event, as depicted, base 940 comprises one or more springs 955 located between bearing 930 and surface 770, one or more springs 955 attached, for example, to surface 770. In any event, as motor 760 rotates device 100, portion 750a-2 and device 100 one or more of vibrate and oscillate, with one or more springs 955 isolating bearing 930 from surface 770. In other words, bearing 930 one or more of comprises base 940 and is mounted on base 940, at least a portion of base 940 being flexible so that shaft 750a, and/or at least a portion of shaft 750a, is isolated when cooling plate 103 is rotated.

Heretofore implementations have been described where a center-of-rotation and a geometric center of a cooling plate are coincident and/or nominally coincident (i.e. about coincident and/or coincident according to a general symmetry of the cooling plate). However, other implementations are within the scope of the present specification.

Figure 10:
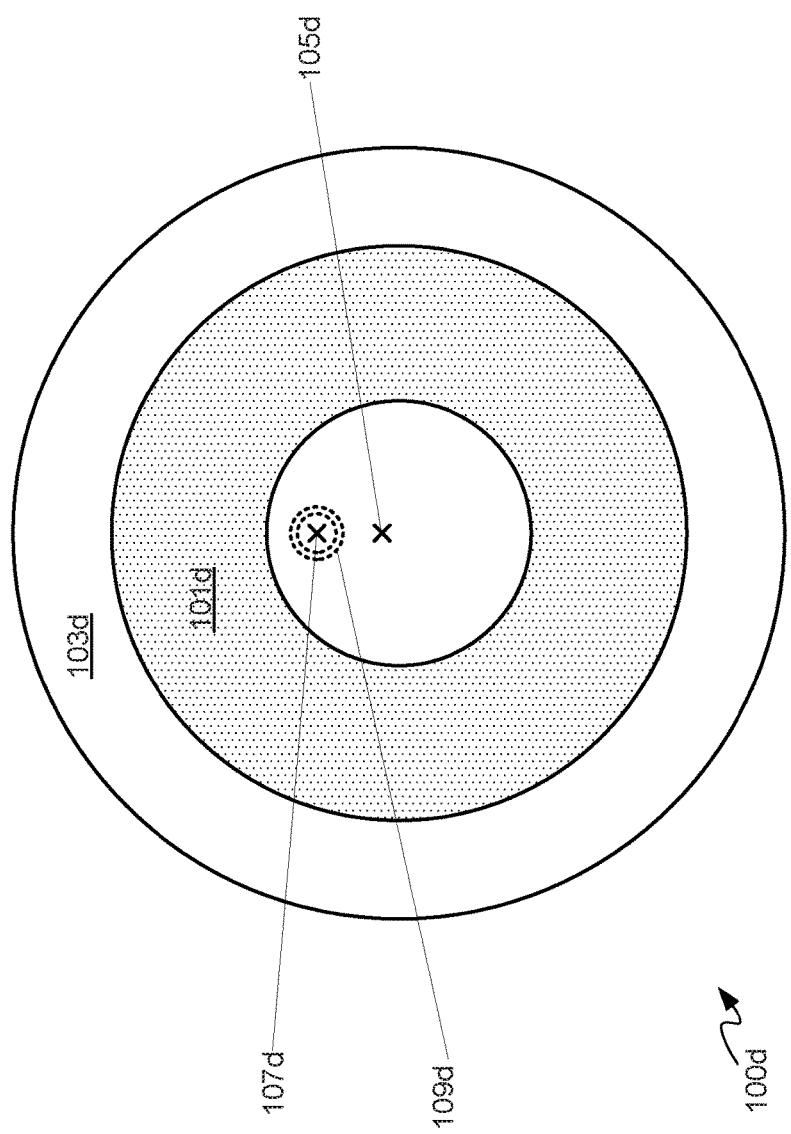
FIG. 10 depicts a front elevation view of a device comprising a light emitting wheel with eccentricity, according to alternate non-limiting implementations.

For example, attention is next directed to FIG. 10 which depicts a device 100d similar to device 100, with like elements having like numbers, but with a "d" appended thereto. Device 100d hence comprises: a light emitting material 101d; a cooling plate 103d configured to cool light emitting material 101d, cooling plate 103d comprising a center-of-mass 105d that is different from a center-of-rotation 107d of cooling plate 103d; and, a hub 109d located at center-of-rotation 107d of cooling plate 103d. In contrast to device 100, however, center-of-rotation 107d is not located at a geometric center of device 100d; indeed, center-of-rotation 107d is different from a geometric center of device 100d. In these implementations, center-of-mass 105d is about at the geometric center of cooling plate 103d.

Figure 11:
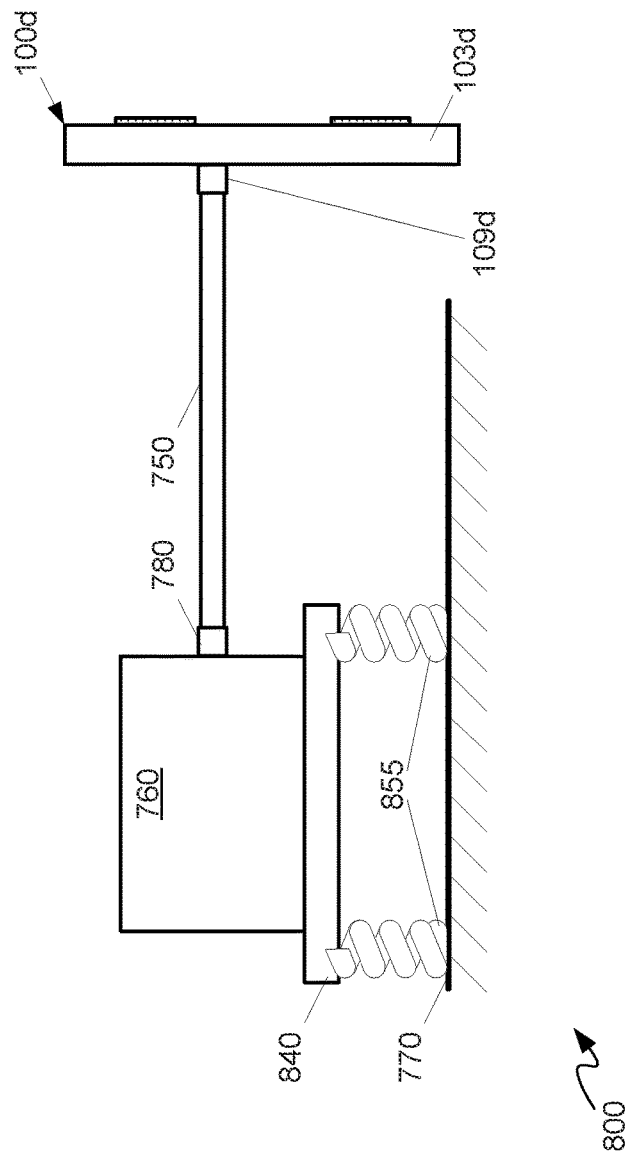
FIG. 11 depicts a system for dispelling a thermal boundary layer at a light emitting wheel, according to alternative non-limiting implementations.

Attention is next directed to FIG. 11, which is substantially similar to 8, with like elements having like numbers, however in FIG. 11, device 100d is mounted to shaft 750 rather than device 100. Hence, eccentricity and/or vibration and/or oscillation is introduced into device 100d when rotated by shaft 750 and motor 760, similar to that described above with respect to device 100. Alternatively, device 100d can be mounted to the system of FIG. 7 (presuming that hub 109d is flexible) or the system of FIG. 9.

It is further appreciated that features from each of devices 100, 100a, 100b, 100c, and 100d can be combined to achieve the desired eccentricity and/or vibration and/or oscillation of a light emitting wheel when rotated. For example, one or more of the above described weights, cut-outs, a lack of circular symmetry, asymmetric tapering, center-of-rotation being different from a geometric center, etc., can be combined in a light emitting wheel.

Figure 12:
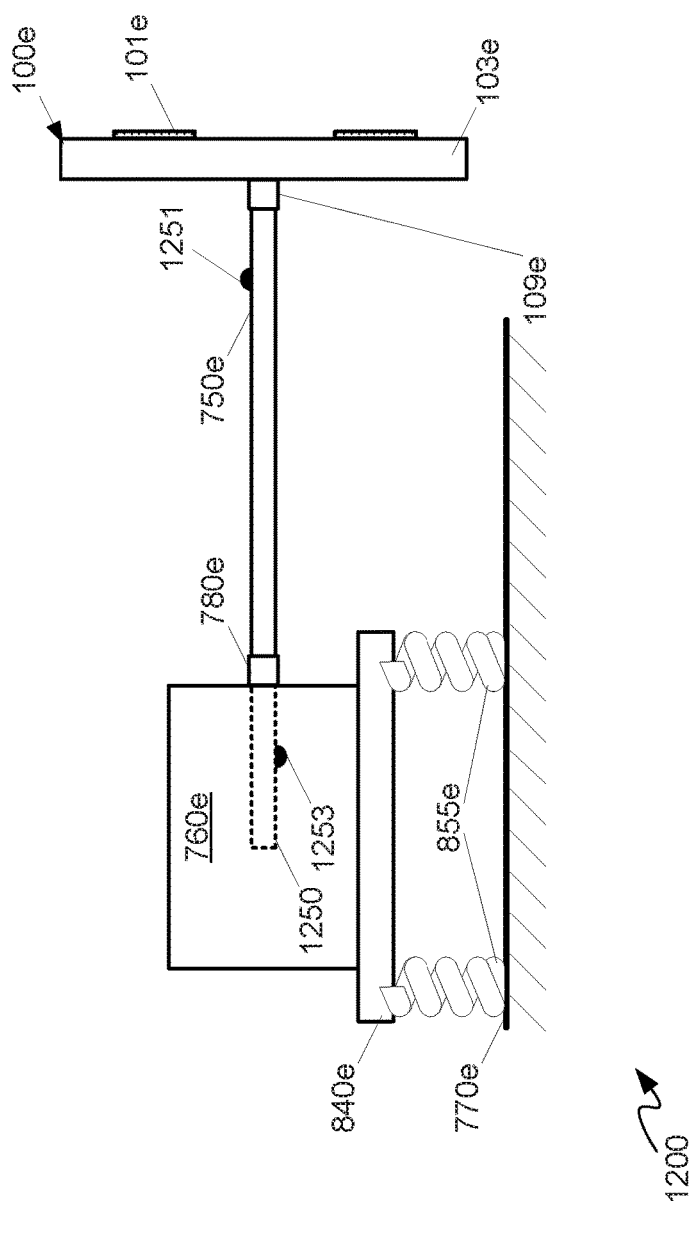
FIG. 12 depicts a system for dispelling a thermal boundary layer at a light emitting wheel, according to alternative non-limiting implementations.

In further implementations, vibration and/or oscillation of a light emitting wheel can be achieved by introducing the vibration and/or oscillation using a system for rotating the light emitting wheel. For example, attention is next directed to FIG. 12 which depicts a system 1200, which similar to system 800, with like elements having like numbers, however with an "e" appended thereto. System 1200 comprises: a device 100e comprising: a light emitting material 101e; a cooling plate 103e configured to cool light emitting material 101e; and, a hub 109e located at a center-of-rotation of cooling plate 103e; a shaft 750e configured to mate with hub 109e; and, a motor 760e configured to rotate shaft 750e so that hub 109e and cooling plate 103e rotate in response to rotation of shaft 750e, one or more of shaft 750e and a rotational portion 1250 of motor 760e configured to one or more of vibrate and oscillate when rotated, which in turn causes device 100e to one or more of vibrate and oscillate when rotated. Shaft 750e is generally connected and/or coupled to motor 760e via a hub 780e of motor 760e; in some implementations, shaft 750e is connected and/or coupled to rotational portion 1250 via hub 780e.

In these implementations, in contrast to device 100, device 100e can be symmetric and/or a center-of-mass is coincident and/or about coincident, with a center-of-rotation, in contrast to previously described devices. The vibration and/or oscillation of device 100e is introduced by one or more of shaft 750e and rotational portion 1250 of motor 760e, for example a rotor and the like. As depicted, one or more of shaft 750e and rotational portion 1250 comprises a respective weight 1251, 1253 for causing the vibration and/or oscillation in system 1200; each depicted weight 1251, 1253 is located away from a longitudinal and/or rotational axis shaft 750e and rotational portion 1250. Hence, when each of shaft 750e and rotational portion 1250 is rotated, vibration and/or oscillation is introduced into system 1200. While each of shaft 750e and rotational portion 1250 is depicted with a respective weight 1251, 1253, it is appreciated that only one weight 1251, 1253 can be present in system 1200 to introduce the vibration and/or oscillation.

In any event, vibration and/or oscillation is introduced into system 1200 by rotating shaft 750e and/or rotational portion 1250, the vibration and/or oscillation of which is translated to device 100e, which in turn vibrates and/or oscillates thereby dispelling thermal boundary layers, similar to those described above with respect to FIG. 3. In some implementations, hub 109e is flexible.

In general, motor 760e is one or more of supported by a surface 770e and mounted to surface 770e, for example table top, a work bench, a portion of a projector, a portion of a light production system and the like. While as depicted surface 770e is "under" motor", in other implementations, surface 770e can be located above, behind and/or beside motor 760e, with motor 760e mounted to surface 770e.

Furthermore, similar to system 800, system 1200 further comprises a base 840e, motor 760e mounted to base 840e, at least a portion of base 840e being flexible. For example, as depicted, base 840e comprises one or more springs 855e located between motor 760e and surface 770e, springs 855e attached, for example, to surface 770e. In any event, as motor 760e rotates device 100e, motor 760e, shaft 750e and device 100 all one or more vibrate and oscillate, with springs 855e isolating motor 760e from surface 770e to protect the mechanical structure of motor 760e and/or to assist in vibration of device 100e.

As depicted, to provide the vibration and/or oscillation, a center-of-mass of one or more of shaft 750e and rotational portion 1205 of motor 760e is located off of a respective rotational axis, as provided by respective weights 1251, 1253. However, one or more of shaft 750e and rotational portion 1205 can be adapted to provide the vibration and/or oscillation can be provided using other methods and/or apparatus. For example, one or more of shaft 750e and rotational portion 1205 can comprise one or more of: weights, cut-outs, a lack of circular symmetry, tapering (e.g. asymmetric tapering), a center-of-rotation being different from a geometric center, etc. to achieve the vibration and/or oscillation.

Further, one or more of systems 700, 800 and 900 can be similarly adapted by adapting one or more of a respective shaft and/or a rotational portion of a respective motor to vibrate and/or oscillate similar to system 1200. In addition, while system 1200 has been described with reference to a symmetric device 100e, device 100e can alternatively be similar to any of devices 100, 100a, 100b, 100c, 100d.

Figure 13:
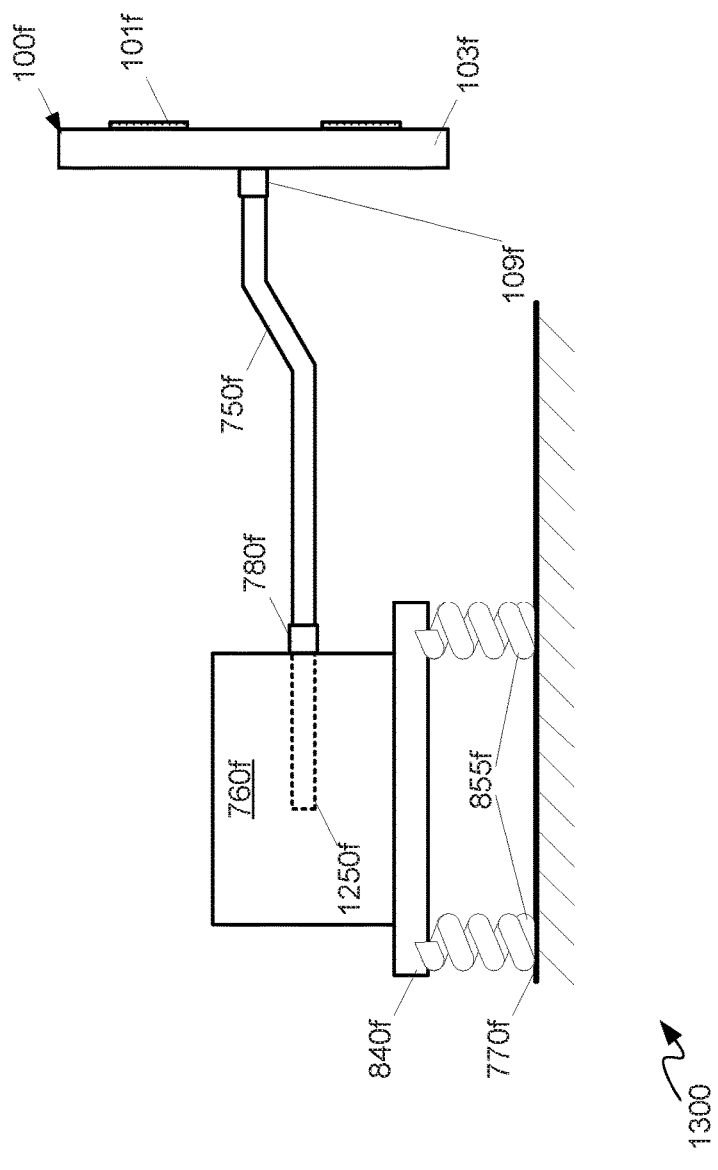
FIG. 13 depicts a system for dispelling a thermal boundary layer at a light emitting wheel, according to alternative non-limiting implementations.

Yet further apparatus for introducing vibration and/or oscillation into a light emitting wheel are within the scope of present implementations. Attention is next directed to FIG. 13 which depicts a system 1300, which similar to system 1200, with like elements having like numbers, however with an "f" appended thereto. System 1300 comprises: a device 100f comprising: a light emitting material 101f; a cooling plate 103f configured to cool light emitting material 101f; and, a hub 109f located at a center-of-rotation of cooling plate 103f; a shaft 750f configured to mate with hub 109f; and, a motor 760f configured to rotate shaft 750f so that hub 109f and cooling plate 103f rotate in response to rotation of shaft 750f, one or more of shaft 750f and a rotational portion 1250f of motor 760f configured to one or more of vibrate and oscillate when rotated, which in turn causes device 100f to one or more of vibrate and oscillate when rotated. Shaft 750f is generally connected and/or coupled to motor 760f via a hub 780f of motor 760f; in some implementations, shaft 750f is connected and/or coupled to rotational portion 1250f via hub 780f. Further, motor 760f is mounted to a flexible base 840f, which comprises springs 855f, which are in turn attached to surface 770f.

However, in contrast to system 1200, in system 1300, one or more of shaft 750f and rotational portion 1250f of motor 760f comprises one or more of a bend and a kink to provide vibration and/or oscillation in system 1300. As depicted, only shaft 750f comprises the bend and/or the kink, however in other implementations rotational portion 1250f can comprise a respective bend and/or kink; either both of shaft 750f and rotational portion 1250f or one of shaft 750f and rotational portion 1250f can comprise a bend and/or kink.

In any event, the bend and/or kink of shaft 750f causes vibration and/or oscillation in system 1300 when shaft 750f is rotated as the center-of-mass of shaft 750f is not aligned with the rotational axis of shaft 750f, similar to system 1200. Hence, shaft 750f one or more of vibrates and oscillates when rotated, which in turn causes device 100f to vibrate and/or oscillate, which in turn dispels a thermal boundary layer at device 100f. The bend and/or kink can be at an angle and position which causes device 100f to one or more of vibrate and oscillate when rotated to dispel a thermal boundary layer; indeed, it is appreciated that the bend and/or kink is not to scale in FIG. 13. Furthermore, one or more of shaft 750f and rotational portion 1250f can comprise more than one bend and/or kink.

As with system 1200, device 100f can be symmetric or similar to one or more of devices 100, 100a, 100b, 100c, 100d. Further any of systems 700, 800, 900 can be adapted so that a respective shaft and/or rotational portion of a respective motor comprises a kink and/or a bend.

In any event disclosed herein is a device comprising a light emitting wheel with an off-center center-of-mass to introduce eccentricity and hence vibration and/or oscillation into the device, when rotated, to reduce and/or eliminate and/or dispel a thermal boundary layer via production of surface turbulence. Such reduction of the thermal boundary layer reduces thermal impedance and hence generally increases convective cooling of the device/light emitting wheel.

Persons skilled in the art will appreciate that there are yet more alternative implementations and modifications possible, and that the above examples are only illustrations of one or more implementations. The scope, therefore, is only to be limited by the claims appended hereto.

What is claimed is:

1. A system comprising:
a device comprising: a light emitting material; a cooling plate configured to cool the light emitting material; and, a hub located at the center-of-rotation of the cooling plate;
a shaft configured to mate with the hub; and,
a motor configured to rotate the shaft so that the hub and cooling plate rotate in response to rotation of the shaft, wherein one or more of the shaft or the rotational portion of the motor comprise one or more of a bend and a kink to shift the center-of-mass off the respective rotational axis to introduce one or more of vibration and oscillation when rotated, which in turn causes the device to one or more of vibrate and oscillate to produce surface turbulence at one or more of the cooling plate and the light emitting material to dispel one or more thermal boundary layers when rotated.

2. The system of claim 1, wherein the center-of-mass is different from a geometric center of one or more of the shaft and the rotational portion of the motor to further shift the center-of-mass off the respective rotational axis to introduce further vibration or oscillation when rotated.

3. The system of claim 1, further comprising base for mounting the motor, the base configured to isolate the motor from a surface supporting the system.

4. The system of claim 3, wherein the base comprises springs to isolate the motor from the surface.

5. The system of claim 1, wherein the device vibrating or oscillating comprises an irregular wobble in the device when rotated.

* * * * *